United States Patent [19]
Young

[11] Patent Number: 6,032,966
[45] Date of Patent: Mar. 7, 2000

[54] BULK DRY WALL ROLLING SUPPORT DEVICE

[76] Inventor: Roland O. Young, R.R. #1, Box 138, Grand Forks, N. Dak. 58201

[21] Appl. No.: 09/024,680

[22] Filed: Feb. 17, 1998

[51] Int. Cl.[7] .................................................. B62B 3/00
[52] U.S. Cl. .................... 280/79.7; 280/79.3; 280/47.34; 414/11
[58] Field of Search ........................ 414/10, 11; 280/79.7, 280/79.3, 79.2, 47.34, 74.731; 211/182, 189, 50, 206

[56] References Cited

U.S. PATENT DOCUMENTS

| | | | |
|---|---|---|---|
| 1,663,571 | 3/1928 | Shedd | 280/79.7 |
| 2,466,149 | 4/1949 | Burg | 280/79.7 |
| 2,967,627 | 1/1961 | Vinson | 414/11 |
| 3,417,877 | 12/1968 | Corley | 414/11 |
| 4,339,219 | 7/1982 | Lay | 414/11 |
| 4,360,211 | 11/1982 | Blake | 280/79.3 |
| 4,978,132 | 12/1990 | Wilson et al. | 280/79.7 |
| 5,037,117 | 8/1991 | Hershberger | 280/47.34 |
| 5,460,469 | 10/1995 | Young | 414/11 |
| 5,584,399 | 12/1996 | King | 280/79.7 |
| 5,584,635 | 12/1996 | Stapelmann | 414/11 |

FOREIGN PATENT DOCUMENTS

| | | | |
|---|---|---|---|
| 670605 | 6/1989 | Switzerland | 280/79.7 |

*Primary Examiner*—Douglas Hess
*Attorney, Agent, or Firm*—Robert E. Kleve

[57] ABSTRACT

The invention comprises a bulk drywall rolling support device. The device has a near horizontal frame with its forward end inclined upward in relation to its rearward end. The frame has a pair of beams on each side with a lateral bar fixed between the beams. A pair of upward extending sleeves are mounted on the outside of each beam. A pair of rods are adapted to be slidably inserted into the sleeves and extend upward and slightly rearward therefrom. The device has four wheels mounted at the corners of the device. Each rod has a handle near it's upper portion for grasping by an operator for rolling the support device about on its wheels. The device is adapted to receive drywall panels with the lower edge of the panels resting onto forward and upward inclined beams and the rear sides of the panels resting against the rods. The device has storage ledges for storing the rods when not in use and a mechanism to lock the rods in their storage position so that the handle on one of the rods may be used to lift the rod and the device.

3 Claims, 1 Drawing Sheet

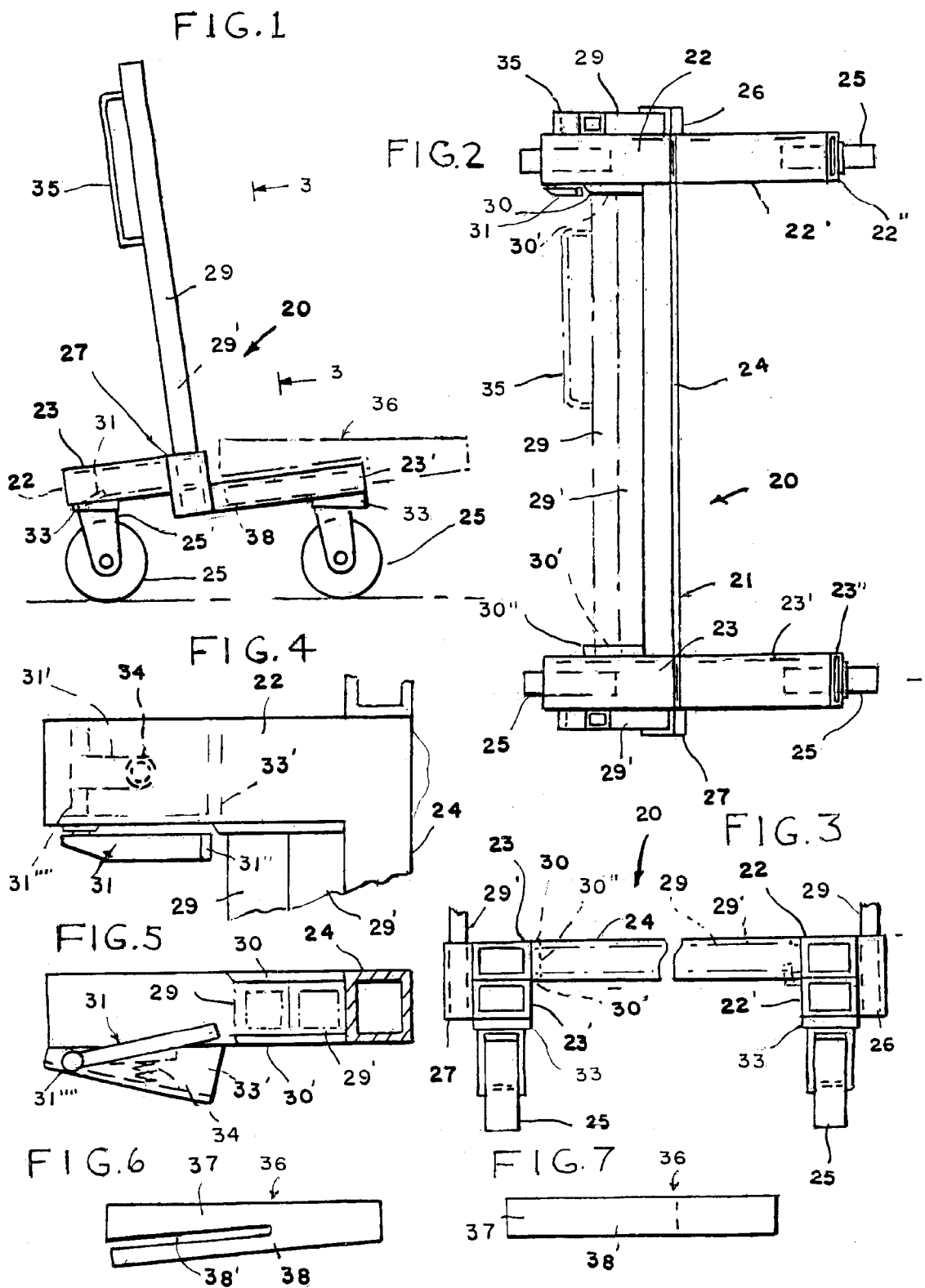

BULK DRY WALL ROLLING SUPPORT DEVICE

This invention relates to a bulk drywall cart device.

It is an object of the invention to provide a novel bulk drywall cart device which can easily transport a large number of drywall sheets to different job sites.

It is a further object of the invention to provide a novel bulk drywall cart apparatus which can be easily moved about on its wheels to different locations on a work site and catty, a relatively large quantity of drywall sheets and or other objects readily thereon.

It is a further object of the invention to provide a novel cart apparatus for transporting various objects about a location.

Further objects and advantages of the invention will become apparent as the description proceeds and when taken in conjunction with the accompanying drawings wherein:

BRIEF DESCRIPTION OF THE DRAWINGS

FIG. 1 is a side elevational view of the bulk dry wall cart device.

FIG. 2 is a top view of the bulk drywall cart device.

FIG. 3 is a fragmentary front view taken along line 3—3 of FIG. 1.

FIG. 4 is an enlarged fragmentary top view of the latching and storing structure for latching and storing the poles when not in use.

FIG. 5 is a fragmentary view.

FIG. 6 is a side elevational view of an horizontal platform insert for insertion each of the forward ends of the pair of inclined beams to provide a horizontal beam like structure.

FIG. 7 is a top plan view of the horizontal platform insert.

BRIEF DESCRIPTION OF PREFERRED EMBODIMENT

Briefly stated, the invention comprises a bulk drywall cart having a generally horizontal rearwardly inclined frame with wheels thereon for moving the call along the ground. The cart has a pair of poles for mounting in an upwardly and rearwardly extending relation to the mobile frame for drywall panels to rest on a rear side portion thereon. The horizontal frame has a pair of forward and slightly upwardly extending beams for the bottoms of the drywall to rest upon while the rear side of the rearward most panel may rest upon the poles.

Referring more particularly to the drawings, in FIG. 1 the bulk drywall cart 20 is illustrated having a generally near horizontal frame 21 with a pair of upper and lower beams 22 and 22' which are fixed together and spaced from a pair of upper and lower beams 23 and 23' also fixed together. The beams 22 and 22' and 23 and 23' extend forward and slightly upward. A lateral beam 24 is fixed between the beams 22 and 23 to fix the beams together. Four caster wheels 25 are rotatably mounted on frames 25' and the frames can rotate about vertical axes so that the caster wheels can swivel about a near vertical axis relative to the ground to change their direction in relation to the ground.

A pair of upward extending sleeves 26 and 27 are fixed to the beams on opposite sides of the frame 21 and a pair of rods 29 and 29' are slidably received in the sleeves 26 and 27. Upper and lower projecting ledges 30 and 30' are fixed to the opposing inside faces of the beams 22 and 23. The rods 29 and 29' may be removed from the sleeves and stored horizontally beside the lateral beam 24 between the horizontal projecting upper and lower ledges 30 and 30' fixed at the opposite inside faces of the beams 22 and 23, as illustrated in phantom lines in FIG. 2. Four inclined brackets 33 are fixed to the bottom of the main frame to the underside of beams 22 and 23 and 22' and 23'. A lever 31 has a rod 31''' a fixed thereto which rod is pivotally mounted about a horizontal axis to the one bracket 33' fixed to the bottom of beam 22. A spring 34 is mounted inside the bracket 33' and projects upward and urges the flange 31' fixed to rod 31''' of lever 31 upward thereby urging the outer forward edge 31'' of the lever upward in front of the outermost rod 29 to hold the rods 29 and 29' in place on the ledges 30 and 30', as shown in solid lines in FIG. 5, by engaging against the rod 29 to prevent rods 29 and 29' from sliding out from the ledges on the beams 22 and 23. The rods 29 and 29' each have handles 35 so that the handle 35 of the outermost rod 29, when locked by the lever 31 on the ledges 30 and 30' of the frame 21, can be used by an operator to lift and carry the frame 21, when the rods 29 and 29' have been stored on the frame 21.

Operation

The frame 21 will be placed on its caster wheels on the ground as illustrated in FIGS. 1–3, inclusive. The rods 29 and 29' will be removed from storage by pivoting the lever 31 clockwise downward when viewed from FIG. 5 to lower the forward edge 31'' of the lever 31 below the rods 29 and 29' so that the rods 29 and 29' can be slide off the ledges and over the top of lever 31 and removed from their storage position and placed in the sleeves 27 and 27'. The device 20 may then be rolled on its caster rollers from place to place by the operator grasping one of the handles 35 of the rods 29 and 29'. Drywall panels may then be stored on the device with their bottom edges resting on the beams 22' and 23' and their upper side portions resting on the rods 29 and 29'. The beams 22' and 23' are large enough that a relatively large number, 10 or more for example, of drywall panels may be stored on the beams 22' and 23' of the device and rolled from place to place as needed in the installation of drywall panels. The space between the beans 22' and 23' is customarily 36 inches so that the space between rods 29 and 29' will be less than the customary length of a drywall panel so that both rods will engage the panel when the panel is evenly aligned relative to them.

When it is desired to remove and store the rods 29 and 29', the lever may be pivoted downward sufficiently, that the rods may be slid over the top of the lever 31 in between the upper and lower flanges 30 and 30', whereupon the spring 34 will urge the lever 31 back up to its position shown in solid lines in FIG. 5 and to lock the rods 29 and 29' at their one ends in place. The beam 23 has a vertical projecting flange 30'', fixed between the upper and lower flanges 30 and 30 at their outside edge on beam 23 to hold the other ends of the rods 29 and 29' in place on the ledges of the frame while the outer end 31' of the lever 31 holds the one ends of the rods 29 and 29' in place, so that the handle 35 of the rod 29 may be used by the operator to lift and carry the device 2 including the frame 21.

One of a pair of horizontal platform inserts 36 is illustrated in FIGS. 6 and 7. Each insert 36 has a lower beam portion 38 which has a conventional rectangular configuration to be received in the rectangular hollow interior 22'' or 23'' of the forward beams 22' or 23', as shown in FIG. 1. When the lower beam portion 38 is slid into the hollow interior of beam 22' or 23' the slotted portion 38'' receives the upper edge of beam 22' or 23', and when fully inserted its upper portion 37 provides a horizontal surface for each beam 22' or 23', rather than its inclined surface, which enables the device to more readily be received and used for transporting some bulky objects, where a horizontal surface may offer an advantage in accomplishing the task.

It will be obvious that various changes and departures may be made to the invention without departing from the spirit an scope thereof, and accordingly, it is not intended that the invention be limited to that specifically described in the specification or as illustrated in the drawings, but only as set forth in the appended claim wherein:

What is claimed is:

1. A bulk drywall rolling support device comprising a near horizontal frame having a forward end inclined upward slightly in relation to a rearward end, said frame having a pair of inclined beams on each side of the frame with a lateral bar fixed between, a pair of upward extending sleeves mounted on each beam, a pair of rods adapted to be slidably inserted into the sleeves and extend upward and slightly, rearward therefrom, said frame having wheels mounted thereon for supporting the frame to enable the frame to roll on the wheels along the ground, each of said rods hating a handle mounted thereto, whereby said device may receive drywall panels thereon with the panels having lower edges resting on the inclined beams and the a panels have rear sides of the rearward most panel resting on the rearwardly inclined rods.

2. A bulk drywall rolling support device according to claim 1, wherein said frame has horizontal storage ledges along the beams along upper and lower portions of the beams with the horizontal ledges confronting one another, a vertical ledge along rearward edges of the horizontal ledges on one of the beams, said horizontal ledges and vertical ledge are one of said beams being rearward of said lateral bar sufficiently to hold the bars at their one ends when stored between the ledges, a latch mechanism mounted to the other of said beams rearward of their horizontal ledges to detachably latch the other ends of the rods there between.

3. A bulk drywall rolling support device according to claim 2, wherein said handles are mounted of facilitate the lifting of the rods.

* * * * *